Dec. 22, 1953  H. T. HODGES  2,663,234
DOUBLE-EXPOSURE PREVENTION DEVICE
Filed Nov. 22, 1950  2 Sheets-Sheet 1

Howard T. Hodges
Inventor

By Daniel I. Mayne
J. Griffin Little
Attorney

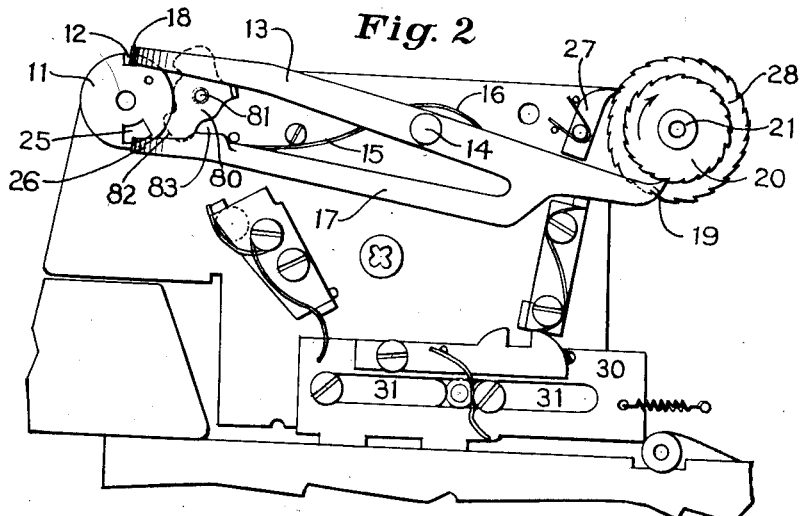
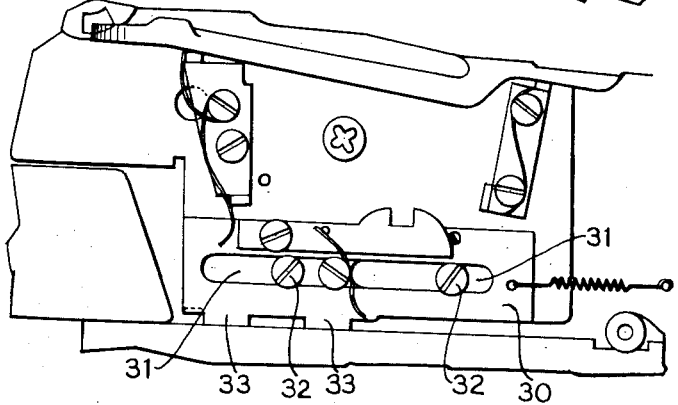
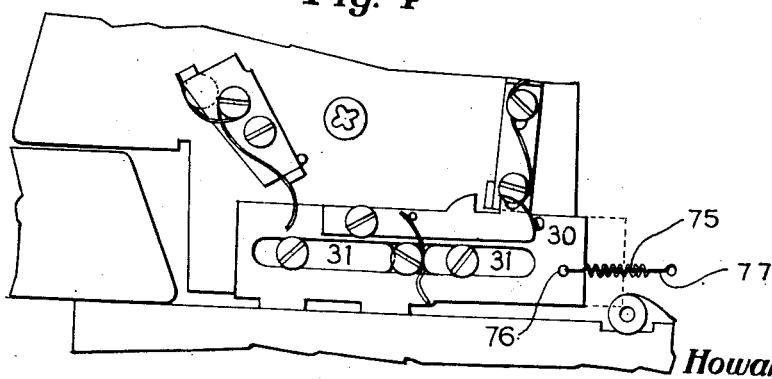

Patented Dec. 22, 1953

2,663,234

UNITED STATES PATENT OFFICE 2,663,234

DOUBLE-EXPOSURE PREVENTION DEVICE

Howard T. Hodges, Rochester, N. Y., assignor to Eastman Kodak Company, Rochester, N. Y., a corporation of New Jersey Application November 22, 1950, Serial No. 197,055

4 Claims. (Cl. 95—31)

The present invention relates to roll film cameras, and more particularly to a film metering and double exposure prevention device for such cameras.

As is well known, in cameras of this type, it is desirable to provide a device which will lock the film winding mechanism automatically at the end of each winding operation. After the exposure has been made, it is necessary to release the previously locked winding mechanism so that the exposed image area may be wound up onto the take-up spindle. In addition, it is desirable to provide an interlock between the shutter actuating mechanism and the film winding mechanism so that the shutter cannot be actuated a second time until the exposed film has been wound. Accordingly, the present invention provides an arrangement by which the locking of the film winding mechanism at the end of the film winding operation serves to unlock the shutter actuating mechanism so that the exposure may be made. The operation of the shutter then serves to unlock the film winding mechanism, and simultaneously lock the shutter actuating mechanism.

The present invention has as its principal object the provision of a novel and effective double exposure prevention device.

A still further object of the invention is the provision of a device of the class described, which is simple in structure, easy to operate, positive in its action, and highly effective in use.

Yet another object of the invention is the provision of an arrangement for locking the film metering mechanism independent of the film winding mechanism so as to release the shutter without winding the film so as to enable a deliberate double exposure to be made.

To these and other ends, the invention resides in certain improvements and combinations of parts, all as will be hereinafter more fully described, the novel features being pointed out in the claims at the end of the specification.

In the drawings:

Fig. 2 is a view of the mechanism, similar to Fig. 1, but showing the relation of the parts at the end of a film winding operation, the winding mechanism being locked and the shutter actuating mechanism being released to permit the making of an exposure.

Fig. 3 is a partial view of the mechanism shown in Fig. 1, showing the relation of the parts at the start of the shutter tripping operation, showing the arrangement for releasing the film locking mechanism by means of the shutter actuating mechanism;

Fig. 4 is a partial view, similar to Figs. 2 and 3, showing a slightly modified mechanism;

Similar reference numerals throughout the various views indicate the same parts.

Figure 1:
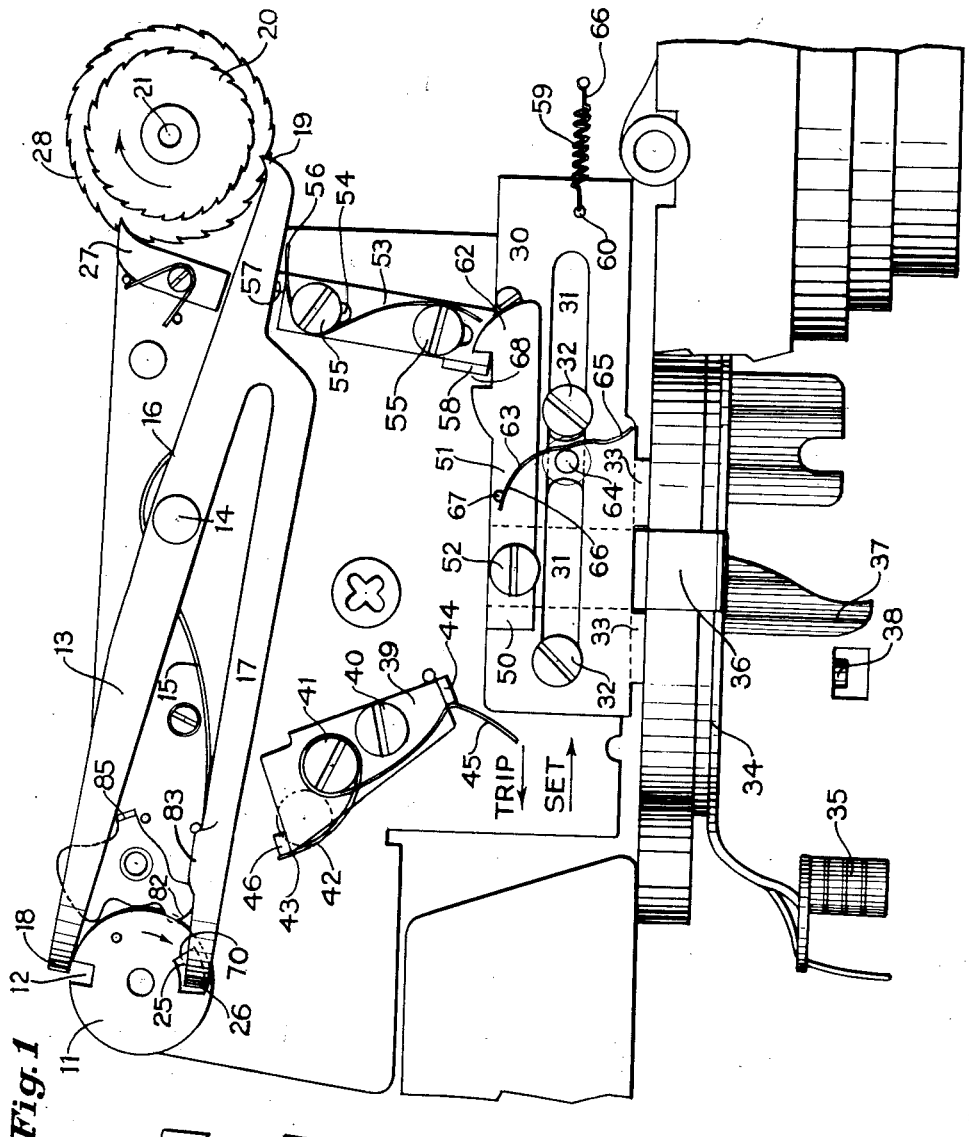
Fig. 1 is a side elevation view of a roll film camera, with the side plate removed, showing the double exposure prevention device of the present invention, the parts being in the position occupied at the end of an exposure and with the film winding mechanism released and the shutter actuating mechanism locked.

As is common and well known practice, a film strip is wound successively from a supply spool across an exposure area and is finally wound up on a take-up spool. During this passage across the camera, the film engages a measuring roll shaft which is rotated by and in timed relation with the film movement. As such structures are well known and form no part of the present invention, they are not designated or described. However, the shaft of the measuring roll has mounted thereon a metering disc 11 which is of such a size as to make a single complete revolution when the film strip has been moved the distance of one image area, all of which is deemed apparent to those skilled in the art.

The disc 11 is formed with a radially extended open-end slot or notch 12, the purpose of which will be later described. A locking or forwarding pawl 13 is pivoted at 14 on the camera. A spring 15 has one end anchored at 16 to the camera and the other end fastened to an arm 17 formed from the material of the pawl 13, as clearly shown in the drawings. The spring 15 tends to rock the pawl 13, with its arm 17, in a counter-clockwise direction, about pivot 14, to move a lug 18 on the left end of the pawl 13 into engagement with the periphery of disc 11. The other or right end of pawl 13 is formed with a tooth 19 adapted to engage a ratchet 20 fixed to the take-up spindle 21 to lock the latter against further movement at the end of each film winding operation. As mentioned above, disc 11 makes one revolution when the film strip is moved the distance of one image area. At this time, the notch 12 has been moved into registry with lug 18, and the pawl 13 rocks, under the action of spring 15, to move the lug 18 into notch 12. Such rocking simultaneously moves tooth 19 into locking relation with ratchet 20 locking spindle 21 against further rotation, as shown in Fig. 2. The disc 11 is also provided with an axially extending opening or recess 25 with which a bent-up lug 26 on the free end of arm 17 is adapted to cooperate in a manner and for a purpose to be later described.

After the tooth 19 engages ratchet 20, as above described, the film is ready for an exposure, and the shutter may be operated to expose the positioned film area. After making the exposure, it is now necessary to wind up the exposed film. It is noted, however, that the parts are in a position shown in Fig. 1 and the take-up spindle is locked. Therefore, it is necessary to move the tooth 19 of pawl 13 out of holding relation with ratchet 20 before the exposed film can be wound up. Obviously, this can be accomplished by imparting a clockwise rotation to pawl 13. Such rotation will not only disengage tooth 19 from ratchet 20 to free spindle 21, but also will withdraw the lug 18 out of notch 12 of disc 11 to free the latter. The wind-up spindle 21 is held against reverse rotation by a pawl 27 which engages a second ratchet 28 carried by spindle 21.

While a plurality of arrangements may be utilized to impart such clockwise rotation to pawl 13, it is preferred to secure such rotation by means of a shutter actuating mechanism. The result is that the tripping of the shutter serves to automatically move the pawl 13 to a released position to unlock the winding spindle only after the shutter has been actuated to make an exposure. To this end, a slide plate 30 is provided with a pair of slots 31 adapted to receive screws 32 to mount the plate 30 on the camera body for sliding movement thereon. The front end of plate 30 is formed with a pair of downwardly turned spaced prongs or lugs 33. A shutter trip ring 34, see Fig. 1, is mounted on the shutter housing in any suitable and well known manner, and is provided with a forwardly extending operating knob 35 by which the ring may be rocked in opposite directions for purposes to be later described. The ring 34 is also provided with a rearwardly projecting finger 36 which extends between lugs 33 to connect the ring 34 to the plate 30. It is thus apparent that rocking of the ring 34 in opposite directions, by means of knob 35, will cause plate 30 to slide in opposite directions. The ring 34 is also provided with an additional forwardly projecting finger 37 which, when knob 35 is moved to the left, as shown in Fig. 1, will engage the shutter trigger 38 to trip or actuate the shutter. As the shutter, per se, may be of any well known construction and does not form a part of the present invention, details thereof are not shown or described.

A release lever 39 is pivoted at 40 on the camera body. A stud 41, carried by lever 39, has a coil spring wrapped therearound. One end 43 of spring 42 is anchored to lever 39 while the other end is tensioned to engage a lug 44 on the lever. The tensioned end terminates in a depending finger 45 which projects below the lever 39 for a purpose to be presently described. The upper end of lever 39 is provided with a projecting lug 46. Now, when the knob 35 is moved to the left, as viewed in Fig. 1, to trip the shutter, the plate 30 is moved to the left by reason of the finger 36 and lugs 33. This leftward movement of plate 30 will cause an edge 50 of a latch 51 pivoted at 52 on plate 30 to engage finger 45. Continued leftward movement of plate 30 will cause release lever 39 to rock in a clockwise direction about its pivot 40 to bring the lug 46 of lever 39 into engagement with arms 17 of pawl 13, rocking the latter in a clockwise direction. Such rocking will withdraw lug 18 out of notch 12, and simultaneously disengage tooth 19 from ratchet 20 to free or release the winding spindle 21. In addition, such rocking of pawl 13 will cause lug 26 of arm 17 to drop into recess 25 to hold the pawl 13 in its released position after lever 39 is moved to its inoperative position, as will be later described. The spring finger 45 provides a yieldable connection between plate 30 and lever 39 to compensate for any manufacturing tolerances, and thus protects the parts against breakage.

A slide plate lock 53 is positioned adjacent and below the right end of pawl 13, as shown in the drawings. Lock 53 is provided with a pair of slots 54 through which screws 55 project to mount lock 53 for sliding movement. A coil spring is wrapped around the upper screw 55 and has the lower end engaging the lower screw 55. The upper free end of the spring engages a lug 57 formed on the lock 53 and tends to move the latter toward pawl 13 or upwardly, as viewed in the drawings. Now, as the pawl 13 is rocked clockwise by means of lever 39, the right end of pawl 13 will engage lug 57 to move the lock plate 53 downward against the action of the spring wrapped around the upper screw 55 to tension the spring. As long as the pawl 13 remains in its released position, Fig. 1, lock 53 will be maintained in its lowermost position as shown in Fig. 1. The lower end of lock 53 is formed with an upturned lug or ear 58.

After the shutter has been tripped, the knob 35 is released to free plate 30. A spring 59 has one end 60 connected to plate 30 and the other end 61 anchored to the camera body, and serves to move the plate 30 to the right or to the position shown in Fig. 1. Such movement also serves to rotate the ring 34 to set or tension the shutter. As the shutter mechanism forms no part of the present invention, it is not shown or described. As the plate 30 moves to the right under the action of spring 59, a cam surface 62 formed on the right end of latch 51 engages lug 58 on lock 53. Such engagement serves to rock the latch 51 clockwise about its pivot 52 to tension a spring 63 which is wrapped around a screw 64 carried by plate 30 between the slots 31. One end, 65 of spring 63, is anchored to plate 30, and the other end 66 engages a pin 67 on latch 51 and tends to rock the latter in a counter-clockwise direction about its pivot 52. Therefore, when lug 58 engages cam 62 it will rock latch 51 clockwise to tension spring 63. However, when the plate 30 reaches its limit of rightward movement, an open end notch 68 formed in the top of latch 51 is moved into registry with lug 58. Thereupon, spring 63 rocks latch 51 counter-clockwise to move the notch 68 into position to receive lug 58, as shown in Fig. 1. Such engagement locks plate 30 against further movement so that a second exposure cannot be made until the exposed image area has been wound up. As the plate 30 moves to the right, as above described, the edge 50 moves out of contact with finger 45 of the release lever 39 to free the latter, which then returns to the position shown in Fig. 1 and out of contact with arms 17 of pawl 13.

The parts are now in the position shown in Fig. 1, and the plate 30, and hence the shutter, is locked against further actuation. It is noted, however, that pawl 13 is positioned so that the tooth 19 is out of engagement with ratchet 20 and lug 18 has been moved out of slot 12 to free the winding mechanism. Thus, when the shutter is locked the winding mechanism is freed so that the exposed image area may be wound up. Now, as the spindle 21 is rotated to wind the film the latter serves to rotate the disc 11 in the direction indicated by the arrow, Fig. 1. During the initial portion of the winding, the lug 26 engages the trailing edge 70 of recess 25 to cam lug 26 out of the recess. The spring 15 then becomes operative to rock pawl 13 in a counter-clockwise direction about its pivot 14 to bring lug 18 into engagement with the periphery of disc 11, the notch 12 having been moved out of registry with lug 18. As the winding continues, the lug 18 rides on the periphery of the disc until, at the end of the winding operation, the disc has been rotated sufficiently to bring the slot 12 again into registry with the lug 18. The spring 15 then serves to rock the pawl to move the lug 18 into slot 12, and also to move the tooth 19 into engagement with ratchet 20 to lock the film winding mechanism. The final rocking of pawl 13 to lock the film winding mechanism moves the latter out of engagement with lug 57 of the slide plate lock 53 to free the latter. The lock 53 then moves upward under the action of its tensioned spring to withdraw lug 58 out of notch 68 to free plate 30, and hence the shutter. Thus, when the film winding mechanism is locked at the end of a film winding operation, the shutter is simultaneously and automatically unlocked to permit the making of an exposure.

In the above-described apparatus, the film winding mechanism and the shutter actuating mechanism are locked alternately so as to prevent the making of a double exposure. In the embodiment illustrated in Figs. 1–3, the spring 59 serves to return the plate 30 to the right a sufficient distance to set or tension the shutter automatically.

In the embodiment shown in Fig. 4, on the other hand, a spring 75 has one end connected to the plate 30 and the other end 77 anchored to the camera. This spring 75 is weaker than the above-mentioned spring 59 and serves to return the plate 30 only partially, as will be noted by a comparison with the plate positions in Figs. 1 and 4. This partial return of plate 30 is not sufficient to tension the shutter, but merely returns the plate 30 to an intermediate or zero position. Therefore, after the film has been wound and the spindle 21 locked and the plate 30 released, it is necessary to move the plate 30, Fig. 4, an additional amount to the right or to a position equivalent to that shown in Fig. 1 to set or tension the shutter. This additional or rightward movement of plate 30 is obtained, not by spring 75, but by rocking the trip ring 34 by means of the knob 35 in a direction opposite to that used in tripping the shutter. When the plate 30 has been moved to the right to tension the shutter, the knob is released and the shutter mechanism serves to return plate 30 to its intermediate or zero position, as shown in Fig. 4. Thus, the tensioning of the shutter in the mechanism illustrated in Fig. 4 is performed manually, while in the mechanism illustrated in Figs. 1 to 3, the shutter is tensioned automatically during its return movement by the spring 59.

The devices of the present invention thus provide mechanisms which prevent the accidental making of a double exposure. However, it is sometimes desirable to make a deliberate double exposure. After one exposure has been made the parts are in the position illustrated in Fig. 1, and the plate 30 locked and the winding mechanism released. Obviously, in order to make a second exposure without winding the film, it is necessary to withdraw lug 58 out of notch 68 to free plate 30.

To secure this result, the present invention provides a means independent of the plate 30 and the film winding mechanism for rocking the pawl 13 from the positions shown in Fig. 1 to that shown in Fig. 2 to release plate 30 without necessitating the winding of the film. This independent means is in the form of a reload lever 80 rockably mounted at 81 on the camera body adjacent the measuring disc 11. This lever 80 is normally in its inoperative position shown in Figs. 1–4. When, however, a deliberate double exposure is to be made, the lever 80 is rocked counter-clockwise to bring the surface 82 thereof under the downturned ear 83 formed on arm 17. Such engagement serves to lift arm 17 upwardly and the lug 26 out of recess 25. The spring 15 now serves to rock pawl 13 in a counter-clockwise direction about its pivot 14 to the position shown in Fig. 2 to again lock the film winding mechanism. In this position the pawl 13 has been moved away from the slide plate lock 53 to free the latter which now moves upward to shift the lug 58 out of notch 68 of latch 51 to free plate 30. After the lever 80 has been rocked to shift pawl 13, it may be returned immediately to its inoperative position shown in the drawings.

The parts are now in position as shown in Fig. 2 and the plate 30 is released. It will be remembered that this freeing of plate 30 has been secured without winding the film after the first exposure has been made. The freed plate 30 may now be moved to the left again to trip the shutter so as to make a deliberate double exposure after which the parts are then returned automatically to the position shown in Fig. 1 to lock the shutter and to release the film winding operation. The double exposured image area may now be wound up on the take-up spool, and at the end of the winding operation the spindle will be locked and the shutter will be released.

Figure 5:
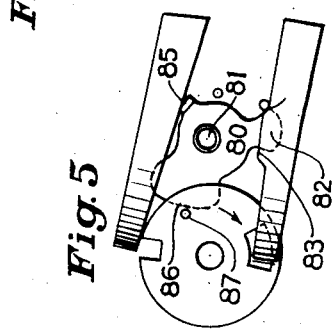
Fig. 5 is a partial view of the mechanism illustrated in Fig. 1, showing the arrangement of parts in making a deliberate double exposure, or during the winding of the trailer and leader strip.

After the last exposure has been made, it is desirable to retain tooth 19 out of engagement with ratchet 20 to permit free unobstructed winding of the trailer and leader strips. To secure this result, it is necessary to provide means for preventing the lug 18 from dropping into notch 12. To this end, the reload lever 80 is formed with a lug or ear 85 adapted to engage pawl 13, when the lever 80 is rotated counter-clockwise, to hold the pawl in its released position as shown in Fig. 5 to permit unobstructed winding of the trailer and leader strips. When the camera is reloaded with a new roll of film, and the first image area has been moved into position, the lever 80 is returned to its inoperative position, shown in Figs. 1 and 2, and out of engagement with pawl 13. The spring 15 thus imparts a counter-clockwise rotation to pawl 13 to move lug 18 into notch 12 and to engage tooth 19 with ratchet 20 to lock the winding mechanism. The first image area is now in position and as the plate 30 is freed, may be moved to make the first exposure.

During the winding of the trailer and leader strips it is desirable to retain the metering disc 11 in its position shown in Fig. 1 so as to retain the parts in proper phased relation, so that when a new film is positioned in the camera the parts will operate in proper sequence. To this end the disc 11 is connected with the film metering shaft, not shown, by a friction clutch, not shown, of suitable construction. This friction clutch arrangement is clearly shown and illustrated in the applicant's copending application Ser. No. 176,169, filed July 27, 1950, to which reference may be had for a complete disclosure of the friction connection between the measuring shaft and the metering disc. Now, when the lever 80 is rocked to bring lug 85 into engagement with pawl 13, a blocking surface 86 on lever 80 moves into the path of a pin 87 on disc 11 to hold the disc against turning as the metering shaft is rotated during the winding of the trailer and leader strips. Thus, the metering disc is held stationary during such winding, and the parts are retained in proper phased relation.

Thus, the present invention provides a film metering and double exposure prevention device which will prevent the making of an accidental double exposure. However, a deliberate double exposure may be made if desired. The parts are retained in proper phased relation during the winding of the trailer and leader strips. The structure is simple, effective, easy to operate, rugged, and relatively inexpensive to manufacture.

While certain embodiments of the invention have been disclosed, it is to be understood that the inventive idea may be carried out in a number of ways. Therefore, the present application is not to be limited except as necessitated by the scope of the appended claims.

What I claim and desire to secure by Letters Patent of the United States is:

1. In a roll film camera, the combination with a film winding mechanism, means including a pivoted pawl having an end adapted to engage and lock said mechanism automatically at the end of each film winding operation, a setting-type shutter, of a slide plate operatively connected to said shutter and movable in one direction to trip said shutter and movable in another direction to set said shutter, a pivoted release lever positioned between one end of said plate and the other end of said pawl, means on said plate adapted to engage said lever when said plate is moved in said one direction to pivot said lever to move the latter into engagement with said pawl to disengage said one end to release said mechanism, and means positioned to lock said plate when the latter is moved in said other direction to prevent a second actuation of said shutter.

2. In a roll film camera, the combination with a film winding mechanism, means including a pivoted pawl having one end adapted to engage and lock said mechanism automatically at the end of each film winding operation, a setting-type shutter, of a slide plate operatively connected to said shutter and movable in one direction to trip said shutter and movable in another direction to set said shutter, a pivoted release lever positioned between one end of said plate and the other end of said pawl, means on said plate adapted to engage said lever when said plate is moved in said one direction to pivot said lever to move the latter into engagement with said pawl to disengage said one end to release said mechanism, means positioned to lock said plate when the latter is moved in said other direction to prevent a second actuation of said shutter, and means for rendering said locking means inoperative at the end of the film winding operation to free said plate to permit the latter to be moved in said other direction to trip said shutter.

3. In a roll film camera, the combination with a film winding mechanism, means including a pivoted pawl having an end adapted to engage and lock said mechanism automatically at the end of each film winding operation, a setting-type shutter, of a slide plate operatively connected to said shutter and movable in one direction to trip said shutter and movable in another direction to set said shutter, a pivoted release lever positioned between one end of said plate and the other end of said pawl, means on said plate adapted to engage said lever when said plate is moved in said one direction to pivot said lever to move the latter into engagement with said pawl to disengage said one end to release said mechanism, a locking member positioned between said plate and said one end of said first means, said member being moved by said one end toward said plate when said one end is disengaged, and means on said plate adapted to engage said member when said plate is moved in the setting direction to lock said plate to prevent a second actuation of said shutter.

4. In a roll film camera, the combination with a film winding mechanism, means including a pivoted pawl having an end adapted to engage and lock said mechanism automatically at the end of each film winding operation, a setting-type shutter, of a slide plate operatively connected to said shutter and movable in one direction to trip said shutter and movable in another direction to set said shutter, a pivoted release lever positioned between one end of said plate and the other end of said pawl, means on said plate adapted to engage said lever when said plate is moved in said one direction to pivot said lever to move the latter into engagement with said pawl to disengage said one end to release said mechanism, a locking member positioned between said plate and said one end of said first means, said member being moved by said one end toward said plate when said one end is disengaged, means on said plate adapted to engage said member when said plate is moved in the setting direction to lock said plate to prevent a second actuation of said shutter, the movement of said one end of said pawl into locking relation with said mechanism serving to free said member, and means for moving the freed lever out of locking relation with said plate to free the latter so that it may be moved to trip said shutter.

HOWARD T. HODGES.

References Cited in the file of this patent

UNITED STATES PATENTS

| Number | Name | Date |
| --- | --- | --- |
| 2,345,999 | Babcock | Apr. 4, 1944 |
| 2,478,394 | Harvey | Aug. 9, 1949 |

FOREIGN PATENTS

| Number | Country | Date |
| --- | --- | --- |
| 598,202 | Great Britain | Feb. 12, 1948 |